United States Patent Office 2,731,502
Patented Jan. 17, 1956

2,731,502
HYDROXYLATION PROCESS

Curtis W. Smith, Berkeley, Calif., assignor to Shell Development Company, Emeryville, Calif., a corporation of Delaware No Drawing. Application September 26, 1952, Serial No. 311,801

8 Claims. (Cl. 260—635)

This invention relates to the production of polyhydroxy compounds having hydroxyl groups attached to adjacent carbon atoms by reaction of peroxide hydroxylating agents with olefinic compounds. The invention deals with the use of a new type of catalyst for this reaction.

The catalysts which have been most generally used for the hydroxylation of olefinic compounds are oxides such as osmium dioxide, tungstic oxide, vanadium pentoxide, chromic oxide, selenium dioxide and the like. These catalysts give good yields and conversions in most cases but certain of them, particularly osmium dioxide, are very expensive, and all are rather difficult to recover from the reaction products in a form suitable for reuse in the process. Sulfuric acid has also been proposed as a catalyst for hydroxylation, but it has not been much used because its activity leaves much to be desired, and its tendency to promote side reactions is another serious disadvantage.

An important object of the invention is the provision of a method of hydroxylating olefinic compounds in which a new type of hydroxylation catalyst is employed. A special object is to provide catalysts for the hydroxylation which remain soluble in the reaction mixture throughout the reaction whether the process is carried out in aqueous solution or in organic solvents. Another object is the provision of a method of hydroxylating olefinic compounds by reaction with peroxides which is cheap and simple to carry out without resort to complicated catalyst recovery methods. Still other objects and advantages of the new method will be apparent from the following description of the invention.

It has been found that the addition of peroxides to olefinic compounds, that is, to organic compounds having at least one olefinic double bond directly linking together two carbon atoms of aliphatic character, to form polyhydroxy compounds can be effectively catalyzed by a small amount of an organic sulfonic acid. This was not to be expected since it might have been predicted that the organic sulfonic acids would be more likely to promote hydration, esterification and/or polymerization than the desired hydroxylation reaction. These catalysts are readily available or easily prepared in a form suitable for hydroxylation of olefinic compounds in any chosen reaction medium. They not only are capable of giving good yields and conversions to desirable polyhydroxy products but also are economical to use.

An especially advantageous subclass of the organic sulfonic acid catalysts used in the process of the invention are the aromatic sulfonic acids. These include the mono- and poly-sulfonic acids of benzene, naphthalene, diphenyl, phenanthrene, anthracene, fluorene and the like, all of which are effective in the process, but alkyl aromatic sulfonic acids are the more preferred members of this subgroup of catalysts. Examples of such sulfonic acids which have been found to be suitable as hydroxylation catalysts are, for instance, the ortho-, meta- and para-toluene monosulfonic acids; the toluene disulfonic acids; the mono- and di-sulfonic acids of ortho-, meta- and para-xylenes; ortho-, meta- and para-ethyl benzene monosulfonic acid; the corresponding isopropyl- or tertiary butyl-benzene monosulfonic acids; and higher alkyl benzene sulfonic acids having 5 to 20 carbon atoms or more in the alkyl group, such as the amyl benzene mono- and di-sulfonic acids, nonyl-, dodecyl- and pentadecyl-benzene sulfonic acids, especially those obtainable by sulfonating the products of alkylation of benzene with olefin polymers, particularly propylene polymers. Alkyl naphthalene sulfonic acids such as the methyl, ethyl and isopropyl naphthalene sulfonic acids are other examples of suitable catalysts. Preferred alkyl aromatic sulfonic acids for use as hydroxylation catalysts in aqueous media are the mono- and di-sulfonic acids of the benzene series having not more than three carbon atoms in an alkyl group. When carrying out the hydroxylation in media in which water-soluble sulfonic acids are insufficiently soluble, it is advantageous to use alkyl aromatic sulfonic acids having longer chains, preferably of about 8 to 18 carbon atoms, for example, octyl benzene sulfonic acid, lauryl benzene sulfonic acid, stearyl benzene disulfonic acids, etc.

Aliphatic sulfonic acids are another type of sulfonic acids which it has been found can be used as hydroxylation catalysts according to the method of the invention. Thus, methyl sulfonic acid, ethyl sulfonic acid, normal and isopropyl sulfonic acids, the butyl sulfonic acids, 1,2-butane-disulfonic acid, decane sulfonic acid, and the like are effective as catalysts. This is also true of substituted sulfonic acids such as isethionic acid, hydroxy propane sulfonic acid, sulfoacetic acid, sulfoisobutyric acid and sulfonated higher fatty acids and their esters or glycerides, for instance.

A special feature of the invention is the use, as catalysts for the hydroxylation of water-insoluble olefinic compounds in aqueous media, of organic sulfonic acids having a hydrophobic chain of sufficient length to impart emulsifying properties to the molecule. Such catalysts not only promote the desired hydroxylation reaction but also are effective in dispersing the water-insoluble olefinic compound in a finely divided form throughout the aqueous reaction medium, thus facilitating intimate contact with the peroxide hydroxylating agent with resulting improvement of the reaction, especially with respect to reaction rate. Especially advantageous organic sulfonic acids for use in this modification of the invention are sulfonated hydrocarbons having a hydrocarbon chain of at least 8 carbon atoms. Preferably, acids having a sulfonic acid group at or near the middle of a hydrocarbon radical of about 10 to about 20 carbon atoms are used. Alkane sulfonic acids containing a chain of about 10 to 18 carbon atoms, or mixtures of alkane sulfonic acids having an average chain length of 10 to 18 carbon atoms, have an especially advantageous combination of catalytic activity and emulsification power in the hydroxylation of water-insoluble olefinic compounds, especially olefins in the liquid phase, particularly the normally liquid olefins of five or more carbon atoms per molecule, by reaction with peroxide hydroxylating agents, preferably hydrogen peroxide, in aqueous media. Alkyl aromatic sulfonic acids of 10 to 24, preferably 12 to 18, carbon atoms per molecule are another group of acids combining catalytic activity and emulsifying power useful in the new process. Alkyl benzene sulfonic acids and alkyl phenol sulfonic acids, which have at least one alkyl chain of 8 to 16 carbon atoms, and alkyl naphthalene sulfonic acids, having alkyl groups of 1 to 5 carbon atoms, are examples of effective catalysts of this type.

One or more organic sulfonic acid catalysts of the invention can be used as the sole hydroxylation catalyst in the process or they may be used in combination with other catalysts of hydroxylation. The sulfonic acids having emulsifying powers are particularly advantageous for use with oxides or acids such as tungstic oxide or tungstic acid, etc., in promoting the hydroxylation of olefinic compounds in aqueous media in which they are insoluble.

Instead of individual organic sulfonic acids, it is often advantageous to use mixtures, several types of which are readily available commercially. For example, sulfonic acid salt mixtures used as detergents or wetting agents can be acid-treated to liberate the free sulfonic acids for use as the hydroxylation catalyst. This is often a convenient way of obtaining higher alkane sulfonic acids such as are produced by reacting paraffins of 8 to 20 carbon atoms per molecule with sulfur dioxide and chlorine followed by hydrolysis of the sulfonic acid chlorides produced, salts of which are often referred to as "mersolates." Similarly, the well known keryl benzene sulfonic acids can be used, as well as the sulfonic acids of Turkey red oil, for example.

These and similar organic sulfonic acids are effective catalysts for the hydroxylation of olefinic compounds of many different types. Among the olefinic hydrocarbons which have been successfully hydroxylated are, for example, mono-olefins such as ethylene, propylene, 1-butene, 2-butene, isobutylene, the amylenes, 1-octane, 1-decene, dodecenes from propylene polymerization, 1-hexadecene, cyclopentene, cyclohexene, 4-methylcyclohexene, octahydronaphthalene, and styrene; polyolefins such as alliene, butadiene, isoprene, cyclopentadiene, cyclohexadiene, hexahydronaphthalene, 1,4-divinylbenzene, etc. Unsaturated alcohols are another class of olefinic compounds which can be effectively hydroxylated with the described new hydroxylation catalysts. These alcohols include, for instance, allyl alcohol, methallyl alcohol, crotyl alcohol, allyl carbinol, methyl vinyl carbinol, dimethyl allyl carbinol, oleyl alcohol, citronellol, geraniol, linalool, cyclohexenol, the terpineols, cinnamyl alcohol in homogeneous solution, and related mono- and polyolefinic mono- and polyhydroxy alcohols. Ethers of the foregoing alcohols which may be the simple ethers or mixed ethers with either saturated or unsaturated alcohols, as well as vinyl ethers, can likewise be hydroxylated with advantage under the catalytic influence of the described sulfonic acids. Typical of these ethers are methyl vinyl ether, divinyl ether, allyl vinyl ether, diallyl ether, ethyl allyl ether, isopropyl isopropenyl ether, methallyl butyl ether, acrolein acetal, allyl cyclohexyl ether, methyl cyclohexenyl ether, ethyl oleyl ether, methallyl cinnamyl ether, etc.

Unsaturated carboxylic acids such as acrylic acid, methacrylic acid, crotonic acid, vinyl acetic acid, tiglic acid, oleic acid, linoleic acid, ricinoleic acid, sorbic acid, maleic acid, tetrahydrobenzoic acid, cyclohexylidene acetic acid, cinnamic acid, etc. can likewise be hydroxylated with advantage by the new process. Esters of these acids with saturated or unsaturated alcohols or esters of the previously mentioned olefinic alcohols with carboxylic acids constitute another class of unsaturated compounds with which the present catalysts are especially useful in promoting hydroxylation. Examples of suitable esters are, for instance, methyl acrylate, ethyl methacrylate, propyl crotonate, allyl crotonate, allyl acetate, oleyl acetate, cyclohexyl acrylate, diethyl maleate, acrolein diacetate, oleyl cinnamate, ethyl linoleate, and the like. Olefinic ketones or aldehydes can also be reacted under the catalytic influence of organic sulfonic acids, in accordance with the invention, although oxidation to acids may accompany the hydroxylation in the case of the olefinic aldehydes. Carbonyl compounds of this type which can be used in the process are, for example, methyl vinyl ketone, methyl allyl ketone, ethyl isopropenyl ketone, mesityl oxide, phorone, isophorone, methyl cyclohexenyl ketone, vinyl phenyl ketone, benzyl acetone, acrolein, crotonaldehyde, citronellal, the cyclo-citrals, ionone, cinnamyl aldehyde, etc. Unrestricted halides such as allyl chloride, crotyl bromide, methallyl chloride and the like are another type of olefinic compounds which can be successfully hydroxylated with the described sulfonic acid catalysts.

Any suitable peroxy hydroxylating agent can be used in the new process, although peroxy compounds are generally preferred. Most preferably, hydrogen peroxide is employed, but other inorganic peroxides and organic peroxides are effective. Sodium and barium peroxide and the like are examples of other inorganic peroxides which can be used, while typical organic peroxides are, for instance, tertiary butyl peroxide or hydroperoxide, benzoyl peroxide, tertiary amyl hydroperoxide, performic, peracetic, perphthalic and like acids, etc., as well as the mixed peroxides obtainable by partial oxidation of hydrocarbons, for example, as described in U. S. Patent 2,376,257.

The reaction is preferably carried out in the liquid phase and, most advantageously, in a mutual solvent for the reactants. Depending on the solubility of the olefinic compound being hydroxylated, an aqueous medium or alcohols, preferably tertiary alcohols, are suitable. A stoichiometric excess of the olefinic compound being hydroxylated to peroxy hydroxylating agent is generally desirable—most preferably, about 1.1 to about 4 moles of olefinic compound per mole of peroxide is used. At temperatures of the order of about 0° C. to about 100° C., the reaction can usually be completed in from about 2 to 6 hours, the optimum operating conditions in any case being dependent upon the particular olefinic compound which is to be hydroxylated and the hydroxylating agent chosen. As a general rule, an amount of organic sulfonic acid in about 1 to 20 mole per cent of the olefinic compound which is being hydroxylated is effective, the preferred range being about 5% to about 12%.

Either batch, intermittent or continuous methods of operation can be used at ordinary, elevated or reduced pressure. On completion of the reaction the catalyst can be recovered from the products by distillation and/or extraction and reused in the process.

The following examples illustrate suitable methods of carrying out the new method of hydroxylation and show some of the advantages obtainable with the new type of catalyst for this reaction.

*Example I*

To a solution of 82 grams (1.0 mole) of cyclohexene and 19 grams (0.1 mole) of p-toluenesulfonic acid monohydrate in 150 ml. of tertiary butyl alcohol was added with stirring 38 grams (1.0 mole) of 90% hydrogen peroxide. The rate of addition was such as to maintain the reaction temperature at 50–55° C., and after completion of the addition, the reaction mixture was warmed at 70° C. for 6 hours (an ice water condenser was used to prevent loss of cyclohexene). Iodometric titration then indicated that 85% of the peroxide had been consumed, so a small amount of 5% palladium on charcoal was added to decompose the excess peroxide. The mixture was left at room temperature overnight and then treated with 8.2 grams of anhydrous sodium acetate to neutralize the excess sulfonic acid (as determined by titration of an aliquot with alkali). The solvent was removed by Claisen distillation at 50 mm. pressure until a heavy precipitate of sodium p-toluenesulfonate and cyclohexanediol formed. The magma was warmed with 40 ml. of ethyl acetate to dissolve the diol and leave the insoluble sodium salt which was removed by filtration. Concentration of the ethyl acetate solution gave 62 grams (54% conversion on peroxide) of solid trans-1,2-cyclohexanediol which, after recrystallization from ethyl acetate, had a melting point of 101–3° C.

*Example II*

Allyl alcohol was reacted with hydrogen peroxide using 1.11 moles of the alcohol per mole of hydrogen peroxide and adding the peroxide to the alcohol over a period of four hours followed by further reaction for an additional hour. At 90–98° C., under reflux, in the presence of about 5 mole per cent of para-toluenesulfonic acid as catalyst per mole of allyl alcohol, the yield of glycerine, based on peroxide, is 57%.

Using a reaction temperature of about 40° C., a 53% conversion of allyl alcohol to glycerol in 75% yield, based on hydrogen peroxide, can be obtained.

*Example III*

By the method of Example I, hydroxylation of acrylic acid in the presence of about 6 mole per cent of ethyl sulfonic acid gives a yield of glyceric acid of about 60% based on the hydrogen peroxide used.

Equally good results were obtained in hydroxylating diallyl ether to produce diglyceryl ether under the same conditions.

*Example IV*

Tartaric acid was produced by reacting maleic acid and hydrogen peroxide in the presence of dodecyl benzene sulfonic acid as catalyst, using 1.5 moles of maleic acid per mole of hydrogen peroxide which was added as a 34% aqueous solution. At a reaction temperature of 50–60° C. a yield of tartaric acid of about 80% can be obtained.

*Example V*

Cyclohexene was hydroxylated by addition of a 34% solution of hydrogen peroxide to an aqueous dispersion of 82 parts by weight of cyclohexene in 724 parts of water containing 4.32 parts by weight of tungstic acid and 7.53 parts by weight of a mixture of $C_{10}$—$C_{13}$ alkane sulfonic acids. These sulfonic acid catalysts were obtained by treating the corresponding sodium sulfonates with sulfuric acid to liberate the free sulfonic acids. The sodium sulfonates were predominantly 2-alkane sulfonates produced by oxidizing the corresponding mercaptans from addition of hydrogen sulfide to cracked wax olefins of 10 to 13 carbon atoms per molecule and neutralizing with sodium hydroxide. The hydrogen peroxide was added in an amount corresponding to a mole ratio to cyclohexene of 1:2. The reaction temperature was maintained at 50° C. and a yield of 1,2-cyclohexanediol of 62.5%, based on the cyclohexene consumed, was obtained.

It will thus be seen that the new process offers many advantages in the hydroxylation of olefinic compounds by reaction with peroxide hydroxylating agents. The process can be varied not only with respect to the types of olefinic compounds which can be hydroxylated in regard to the peroxidic compounds which can be reacted therewith, but also in relation to the procedure and conditions used for carrying out the reaction. The invention will therefore be recognized as not restricted to the details which have been given by way of illustrative example, nor by any theory proposed in explanation of the advantageous results which are obtained.

I claim as my invention:

1. A process for the hydroxylation of a mono-olefinic compound containing the olefinic linkage between two aliphatic carbon atoms, each of which carbon atoms has the two remaining valences satisfied by single-bonded linkage to separate atoms, and said compound containing no other elements than carbon, hydrogen, oxygen and halogen which comprises reacting said olefinic compound with hydrogen peroxide at a temperature between about 0° C. and about 100° C. in the presence of a catalytic amount between about 1 and about 20 mole percent, based on said olefinic compound, of an organic sulfonic acid of the group consisting of aliphatic sulfonic acids of 1 to 18 carbon atoms per molecule and aromatic carbocyclic sulfonic acids having 6 to 24 carbon atoms per molecule.

2. A process in accordance with claim 1 wherein the reaction is carried out in a mutual solvent for said olefinic compound, peroxide and catalyst providing a homogeneous liquid medium for the reaction.

3. A process in accordance with claim 1 wherein the reaction is carried out in an aqueous solution under the catalytic influence of a water soluble organic sulfonic acid.

4. A process for the hydroxylation of a mono-olefinic compound containing the olefinic linkage between two aliphatic carbon atoms, each of which carbon atoms has the two remaining valences satisfied by single-bonded linkage to separate atoms, and said compound containing no other elements than carbon, hydrogen, oxygen and halogen which comprises reacting said olefinic compound with hydrogen peroxide at a temperature between about 0° C. and about 100° C. in the presence of a catalyst consisting essentially of about 5 to about 12 mole percent, based on said olefinic compounds, of an organic sulfonic acid of the group consisting of aliphatic sulfonic acids of 1 to 18 carbon atoms per molecule and aromatic carbocyclic sulfonic acids having 6 to 24 carbon atoms per molecule.

5. A process for producing a trihydric alcohol which comprises reacting a mono-olefinic monohydric alcohol containing no other elements than carbon, hydrogen and the oxygen of the hydroxyl group with hydrogen peroxide at a temperature between about 0° C. and about 100° C. in the presence of a catalytic amount between about 1 and about 20 mole percent, based on said alcohol, of aliphatic sulfonic acid of 1 to 18 carbon atoms per molecule.

6. A process for producing a glycol which comprises reacting a mono-olefinic hydrocarbon with hydrogen peroxide at a temperature between about 0° C. and about 100° C. in the presence of a catalytic amount between about 1 and about 20 mole percent, based on said olefinic compound, of an organic sulfonic acid of the group consisting of aliphatic sulfonic acids of 1 to 18 carbon atoms per molecule and aromatic carbocyclic sulfonic acids having 6 to 24 carbon atoms per molecule.

7. A process in accordance with claim 6 wherein said organic sulfonic acid is an alkyl benzene sulfonic acid having 8 to 18 carbon atoms in the alkyl group.

8. A process of producing glycerine which comprises reacting a stoichiometric excess of allyl alcohol in aqueous solution with hydrogen peroxide in the presence of about 1 to about 20 mole per cent, based on the allyl alcohol, of a water-soluble alkyl benzene sulfonic acid having not more than 3 carbon atoms in an alkyl group within the temperature range of about 40° C. to about 60° C.

References Cited in the file of this patent

UNITED STATES PATENTS

| | | |
|---|---|---|
| 2,414,385 | Milas | Jan. 14, 1947 |
| 2,421,862 | Arundale et al. | June 10, 1947 |
| 2,437,648 | Milas | Mar. 9, 1948 |
| 2,500,599 | Bergsteinsson et al. | Mar. 14, 1950 |
| 2,510,905 | Raczynski | June 6, 1950 |
| 2,555,927 | Himel et al. | June 5, 1951 |
| 2,613,223 | Young | Oct. 7, 1952 |

FOREIGN PATENTS

| | | |
|---|---|---|
| 759,225 | France | Nov. 16, 1933 |

OTHER REFERENCES

Mugdan et al.: Journal of the Chem. Soc., London, 1949, pgs. 2988 to 2990 and 2993.

Schwartz et al.: Surface Active Agents (pgs. 5 and 111), Interscience Publishers, Inc., New York, 1949.

Mugdan et al.: Chem. Abst. vol. 44, col. 3888-9 (1950.)